US011916828B2

(12) United States Patent
Murakami (10) Patent No.: US 11,916,828 B2
(45) Date of Patent: Feb. 27, 2024

(54) COMMUNICATION SYSTEM, COMMUNICATION METHOD, AND PROGRAM (71) Applicant: DAIKIN INDUSTRIES, LTD., Osaka (JP)

(72) Inventor: Yuuki Murakami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/004,224

(22) PCT Filed: Jun. 21, 2021

(86) PCT No.: PCT/JP2021/023351
§ 371 (c)(1),
(2) Date: Jan. 4, 2023

(87) PCT Pub. No.: WO2022/014264
PCT Pub. Date: Jan. 20, 2022

(65) Prior Publication Data
US 2023/0208581 A1 Jun. 29, 2023

(30) Foreign Application Priority Data

Jul. 13, 2020 (JP) ................................ 2020-119742

(51) Int. Cl.
*H04L 5/00* (2006.01)
*H04W 72/30* (2023.01)
*H04W 72/54* (2023.01)

(52) U.S. Cl.
CPC ........... *H04L 5/0048* (2013.01); *H04W 72/30* (2023.01); *H04W 72/54* (2023.01)

(58) Field of Classification Search
CPC ...... H04L 5/0048; H04W 72/30; H04W 72/54
See application file for complete search history.

(56) References Cited

U.S. PATENT DOCUMENTS 8,339,991 B2 * 12/2012 Biswas .................... H04W 8/26
370/338
8,363,246 B2 * 1/2013 Tanji .................... H04L 61/5076
713/153
9,723,537 B2 * 8/2017 Ostergaard ............. H04W 8/26
9,787,729 B2 * 10/2017 Horiuchi ............. H04L 12/1822
(Continued)

FOREIGN PATENT DOCUMENTS

EP 1494401 B1 * 2/2012 ............. H04L 12/12
EP 2630755 8/2013
(Continued)

OTHER PUBLICATIONS

International Preliminary Report on Patentability for PCT/JP2021/023351 dated Jan. 26, 2023.
(Continued)

*Primary Examiner* — Parth Patel
(74) *Attorney, Agent, or Firm* — IPUSA, PLLC (57) ABSTRACT

Provided is technology to set information on a device appropriately. Provided is a communication system in which a first electronic device and a second electronic device connected to a same wiring, among a plurality of electronic devices, are associated with each other as being installed for a same space, based on an arrangement state of wirings of the plurality of electronic devices arranged according to a configuration of a plurality of spaces.

12 Claims, 3 Drawing Sheets

(56) References Cited

U.S. PATENT DOCUMENTS

| | | | |
|---|---|---|---|
| 10,404,702 B1* | 9/2019 | Chakraborty | H04L 63/101 |
| 2011/0216695 A1* | 9/2011 | Orth | H04W 40/00 |
| | | | 370/328 |
| 2014/0311025 A1* | 10/2014 | Pauls | A01G 9/24 |
| | | | 47/17 |
| 2015/0276252 A1 | 10/2015 | Iida | |
| 2015/0316276 A1* | 11/2015 | Matsugi | F24F 11/0001 |
| | | | 62/160 |
| 2015/0350999 A1* | 12/2015 | Yanagita | H04B 7/155 |
| | | | 370/315 |
| 2016/0036600 A1 | 2/2016 | Hamada et al. | |
| 2016/0381144 A1* | 12/2016 | Malik | H04L 67/125 |
| | | | 455/517 |
| 2017/0149487 A1* | 5/2017 | Hori | H04L 61/256 |
| 2017/0223623 A1* | 8/2017 | Cao | H04W 48/02 |
| 2018/0367667 A1* | 12/2018 | Tran | H04L 61/4557 |
| 2019/0102057 A1* | 4/2019 | Liao | H04L 67/565 |
| 2019/0386957 A1* | 12/2019 | Leon | H04L 63/18 |
| 2020/0211583 A1* | 7/2020 | Kim | G10L 15/26 |
| 2020/0236217 A1* | 7/2020 | Jackson | G06Q 20/4016 |
| 2020/0300489 A1 | 9/2020 | Morishita et al. | |
| 2021/0405993 A1* | 12/2021 | Nagarathnam | H04L 63/123 |
| 2022/0368801 A1* | 11/2022 | Garg | H04W 12/12 |
| 2022/0369215 A1* | 11/2022 | Dees | H04W 76/12 |
| 2023/0078317 A1* | 3/2023 | Xing | H04W 76/14 |
| | | | 370/315 |

FOREIGN PATENT DOCUMENTS

| | | | | |
|---|---|---|---|---|
| EP | 3029933 A1 * | 6/2016 | ......... | H04L 12/1818 |
| EP | 3098533 | 11/2016 | | |
| JP | H11-044447 | 2/1999 | | |
| JP | 2000-088321 | 3/2000 | | |
| JP | 2000-283529 | 10/2000 | | |
| JP | 2006-207949 | 8/2006 | | |
| JP | 2007-324747 | 12/2007 | | |
| JP | 2010-210147 | 9/2010 | | |
| JP | 2015-141014 | 8/2015 | | |
| JP | 2015-165166 | 9/2015 | | |
| JP | 2016-219983 | 12/2016 | | |
| KR | 20170138498 A * | 12/2015 | ............ | H04L 12/14 |
| WO | 2012/052890 | 4/2012 | | |
| WO | 2014/097443 | 6/2014 | | |
| WO | 2014/128921 | 8/2014 | | |
| WO | 2014/170930 | 10/2014 | | |
| WO | 2018/220803 | 12/2018 | | |

OTHER PUBLICATIONS

International Search Report for PCT/JP2021/023351 dated Sep. 21, 2021.

Extended European Search Report dated Dec. 4, 2023 with respect to the corresponding European patent application No. 21842192.3.

* cited by examiner

COMMUNICATION SYSTEM, COMMUNICATION METHOD, AND PROGRAM

TECHNICAL FIELD

The present disclosure relates to a communication system, a communication method, and a program.

BACKGROUND ART

Conventionally, a technology is known in which information related to an external device to be controlled or monitored is set in a device, and the device controls the set external device (refer to, for example, Patent Literature 1).

CITATION LIST

Patent Literature

[PTL 1]
Japanese Patent Laid-Open No. 2000-088321

SUMMARY OF THE INVENTION

Problem to be Solved by the Invention

However, with conventional technology, for example, it is sometimes difficult to set information related to an external device to be controlled in the device.

The purpose of the present disclosure is to provide technology that can properly set information related to a device.

Means to Solve the Problem

A communication system, according to a first aspect of the present disclosure, in which a first electronic device and a second electronic device connected to a same wiring, among a plurality of electronic devices, are associated with each other as being installed for a same space, based on an arrangement state of wirings of the plurality of electronic devices arranged according to a configuration of a plurality of spaces. This enables the information of an external device to be set appropriately.

Further, a second aspect of the present disclosure is the communication system according to the first aspect, wherein the first electronic device and the second electronic device connected to a single network associated with each other among a plurality of networks that are each formed based on the arrangement state of the wirings of the plurality of electronic devices and are each connected via a relay device.

Further, a third aspect of the present disclosure is the communication system according to the first aspect or the second aspect, wherein the first electronic device transmits a reply request including information for specifying a type of the second electronic device, and the second electronic device returns identification information of the second electronic device in a case where a set type of the second electronic device matches the type of the second electronic device received from the first electronic device.

Further, a fourth aspect of the present disclosure is the communication system according to the third aspect, wherein the type of the second electronic device includes at least one of a model of the second electronic device, an item to be measured by the second electronic device, and a command to be executed by the second electronic device.

Further, a fifth aspect of the present disclosure is the communication system according to any one of the first aspect to the fourth aspect, wherein the first electronic device transmits a reply request including information for specifying a transfer range according to a type of the second electronic device, and the communication system determines whether to transfer the reply request to an external network according to the information for specifying the transfer range.

Further, a sixth aspect of the present disclosure is the communication system according to any one of the first aspect to the fifth aspect, wherein the first electronic device transmits a reply request including identification information of a first network to the second electronic device, and the second electronic device returns the identification information of the second electronic device to the first electronic device in a case where received identification information of the first network received from a relay device configured to connect a communication between the first network and the second network matches the identification information of the first network received from the first electronic device.

Further, a seventh aspect of the present disclosure is the communication system according to the sixth aspect, wherein the relay device notifies the first network of identification information of the first network by a broadcast communication.

Further, a eighth aspect of the present disclosure is the communication system according to the sixth aspect or the seventh aspect, wherein the relay device electrically connects the first network and the second network through a high-pass filter that blocks a signal with a frequency below a threshold, transmits a first reply request to the first network with a signal with a frequency below the threshold, notifies the first electronic device of the identification information of the first network in a case where the first reply request is returned from the first electronic device, and notifies the second electronic device of the identification information of the first network in a case where the first reply request is returned from the second electronic device.

Further, a ninth aspect of the present disclosure is the communication system according to any one of the sixth aspect to the eighth aspect, wherein, in a case where identification information of a plurality of second electronic devices is returned with respect to the reply request including the identification information of the first network, the first electronic device associates the plurality of second electronic devices.

Further, a tenth aspect of the present disclosure is the communication system according to any one of the sixth aspect to the ninth aspect, wherein the first electronic device and the second electronic device are electronic devices that perform at least one of measuring environmental information and air conditioning with respect to an indoor space, and the first electronic device transmits a command for controlling the second electronic device or receives data from the second electronic device when the first electronic device is in operation.

Further, an eleventh aspect of the present disclosure is the communication system according to any one of the sixth aspect to the tenth aspect, wherein the first electronic device is a ventilator, the second electronic device is an indoor unit of an air conditioner, and the relay device is an outdoor unit of the air conditioner.

A communication method, according to a twelfth aspect of the present disclosure, implemented by a communication system, the communication method includes associating a first electronic device and a second electronic device connected to a same wiring, among a plurality of electronic devices, as being installed for a same space, based on an arrangement state of wirings of the plurality of electronic devices arranged according to a configuration of a plurality of spaces.

A program, according to a thirteenth aspect of the present disclosure, causes a communication system to execute a process of associating a first electronic device and a second electronic device connected to a same wiring, among a plurality of electronic devices, as being installed for a same space, based on an arrangement state of wirings of the plurality of electronic devices arranged according to a configuration of a plurality of spaces.

MODE FOR CARRYING OUT THE INVENTION

Figure 1:
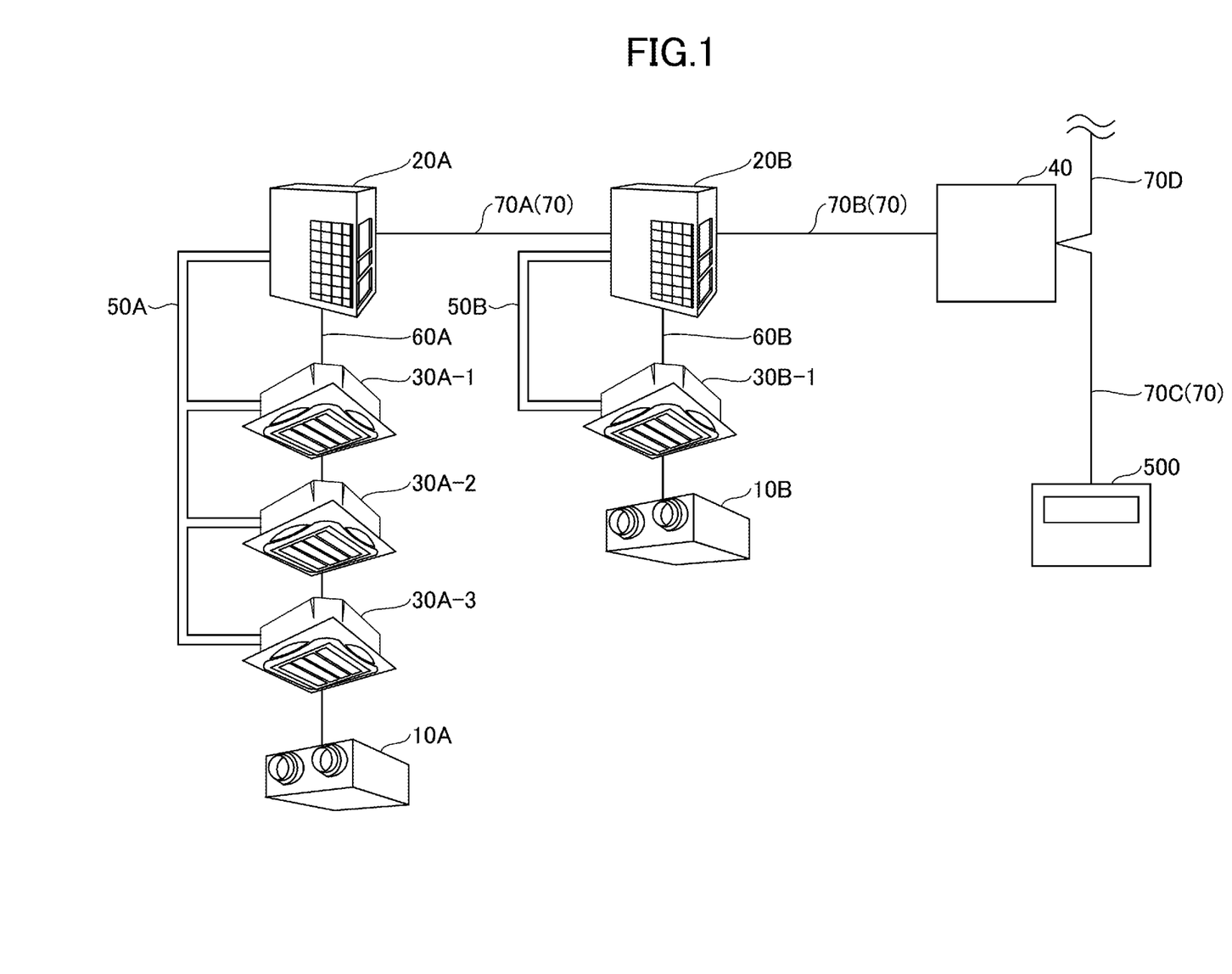
FIG. 1 is a diagram illustrating an example of a system configuration of a communication system according to an embodiment.

Hereinafter, embodiments will be described with reference to the accompanying drawings. Note that, in the present specification and the drawings, constituent elements having substantially the same functional configuration are denoted by the same reference numerals, and redundant description is omitted.
<System Configuration>
First, a system configuration of a communication system 1 will be described. FIG. 1 is a diagram illustrating an example of a system configuration of the communication system 1 according to an embodiment. In the communication system 1 according to the embodiment, a first electronic device and a second electronic device for the same space are associated among multiple devices based on a situation where wiring of the multiple devices is arranged.

As illustrated in FIG. 1, the communication system 1 includes a ventilator (an example of a "first electronic device") and a ventilator 10B (hereinafter, when there is no need to distinguish, simply referred to as a "ventilator 10"). The communication system 1 includes an outdoor unit 20A (a communication device; an example of a "relay device") and an outdoor unit 20B (hereinafter, when there is no need to distinguish, simply referred to as an "outdoor unit 20"). The communication system 1 includes an indoor unit 30A-1 (an example of a "second electronic device"), an indoor unit an indoor unit 30A-3, and an indoor unit 30B-1 (hereinafter, when there is no need to distinguish, simply referred to as an "indoor unit 30"). The communication system 1 also includes an adapter 40 and a controller 500. The number of the ventilator 10, the outdoor unit 20, and the indoor unit 30 is not limited to the example illustrated in FIG. 1.

The outdoor unit 20A, the indoor unit 30A-1, the indoor unit 30A-2, the indoor unit 30A-3, and the ventilator 10A are installed in a facility, such as a building, to condition the air in a predetermined indoor space including one or more rooms (hereinafter referred to as a "space A"). Further, similarly, the outdoor unit 20B, the indoor unit 30B-1, and the ventilator 10B are installed in the facility so as to condition the air in a space B other than the space A, which includes one or more rooms.

The ventilator 10 is installed, for example, on a roof of a building or the like, and air conditions and ventilates the room by taking in outside air using a ventilation fan or the like and delivering it through a duct (air conduit) to a predetermined room including one or more rooms. The ventilator includes a control device 11. The control device 11 controls the same indoor space (For example, the space A) in conjunction with other devices for air conditioning.

The outdoor unit 20 is, for example, an outdoor unit of an air conditioner. The indoor unit 30 is, for example, an indoor unit of the air conditioner. The indoor unit 30 may, for example, accept operations such as setting temperatures, an operation mode, starting operation, and terminating operation by remote control or the like. The operation mode may include, for example, a cooling operation and a heating operation. The indoor unit 30 may, for example, be a sensor that measures environmental information such as temperature and humidity. A controller 500 is, for example, installed in an administrator's room or the like in a facility to control each indoor unit 30 or the like in response to a user's operation.

The indoor unit 30A-1, the indoor unit 30A-2, and the indoor unit 30A-3 are connected to the outdoor unit 20A by a refrigerant pipe 50A. Further, similarly, the indoor unit 30B-1 is connected to the outdoor unit 20B by a refrigerant pipe 50B. The refrigerant may be, for example, fluorocarbons or water.

The outdoor unit 20A, the indoor unit 30A-1, the indoor unit 30A-2, the indoor unit 30A-3, and the ventilator 10A are connected by a communication wiring 60A (an example of the "first network"). The communication wiring 60A may be, for example, a local area network cable or the like. The communication wiring 60A may be a cable capable of communicating according to a predetermined communication protocol. Further, similarly, the indoor unit 30B-1 and the ventilator 10B are connected to the outdoor unit 20B by the communication wiring 60B.

In the example illustrated in FIG. 1, a daisy chain connection (cascade connection) is provided in the order of the outdoor unit 20A, the indoor unit 30A-1, the indoor unit 30A-2, the indoor unit 30A-3, and ventilator 10A. The outdoor unit 20A, the indoor unit 30A-1, the indoor unit 30A-2, the indoor unit 30A-3, and the ventilator 10A are not limited to the daisy chain connection and may be connected by other network topologies such as star or bus.

Figure 2:
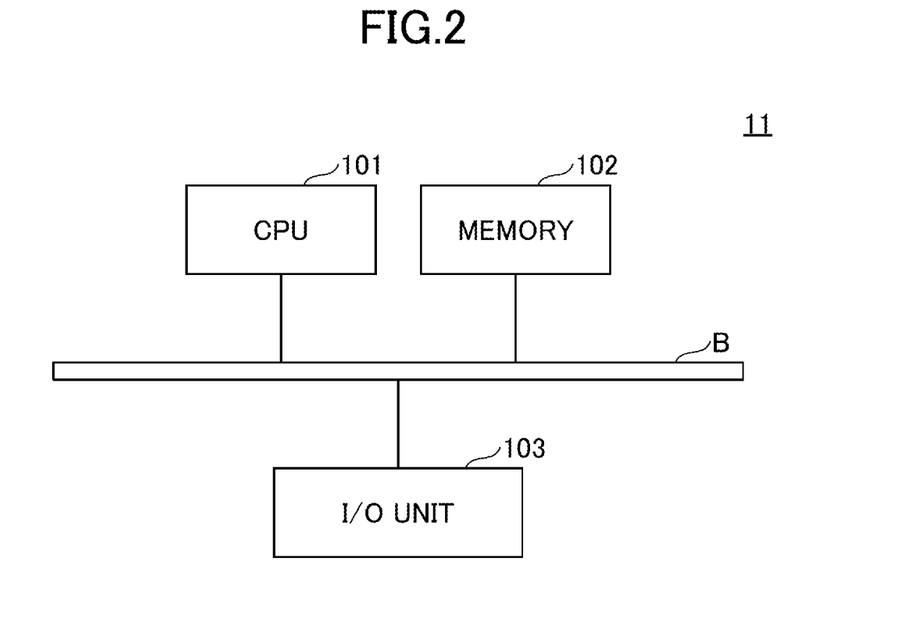
FIG. 2 is a diagram illustrating an example of a hardware configuration of a controller according to an embodiment.

Further, the outdoor unit 20A, the outdoor unit 20B, the adapter 40, and the controller 500 are connected by a communication wiring 70. In the example of FIG. 1, the outdoor unit 20A and the outdoor unit 20B are connected by a communication wiring 70A (an example of a "second network"). The outdoor unit 20B and the adapter 40 are connected by a communication wiring 70B. The adapter 40 and the controller 500 are connected by a communication wiring 70C. The adapter 40 is connected to another adapter (not illustrated) or to another outdoor unit (not illustrated) or the like by a communication wiring 70D (an example of a "third network"). Further, the communication wiring 70C and the communication wiring 70D may be electrically connected.
<Hardware Configuration of Control Device 11 of Ventilator 10>
Next, a hardware configuration of the control device 11 of the ventilator 10 of a communication system 1 according to an embodiment will be described. FIG. 2 is a diagram illustrating an example of a hardware configuration of the control device 11 according to the embodiment.

As illustrated in FIG. 2, the control device 11 may include a Central Processing Unit (CPU) 101, a memory 102, and an I/O unit 103. The control device 11 may be a microcontroller including the CPU 101, the memory 102, and the I/O unit 103 incorporated into a single integrated circuit.

The CPU 101 is an arithmetic device that executes various programs stored in the memory 102. The memory 102 stores various programs and data necessary for the CPU 101 to execute. The I/O unit 103 is a communication device that communicates with an external device.

The memory 102 may acquire and store the program recorded in the recording medium through the I/O unit 103. The recording medium may include a medium that records information optically, electrically or magnetically, for example, a CD-ROM, a flexible disk, a magneto-optical disk, etc. The recording medium may also include a semiconductor memory or the like for electrically recording information, such as a ROM, flash memory or the like.

The memory 102 may acquire and store a program downloaded from the network (not illustrated) through the I/O unit 103.

The control device 11 may be implemented, for example, by circuitry such as an Application Specific Integrated Circuit (ASIC), a digital signal processor (DSP), and a field programmable gate array (FPGA).

<Functional Configuration>

Figure 3:
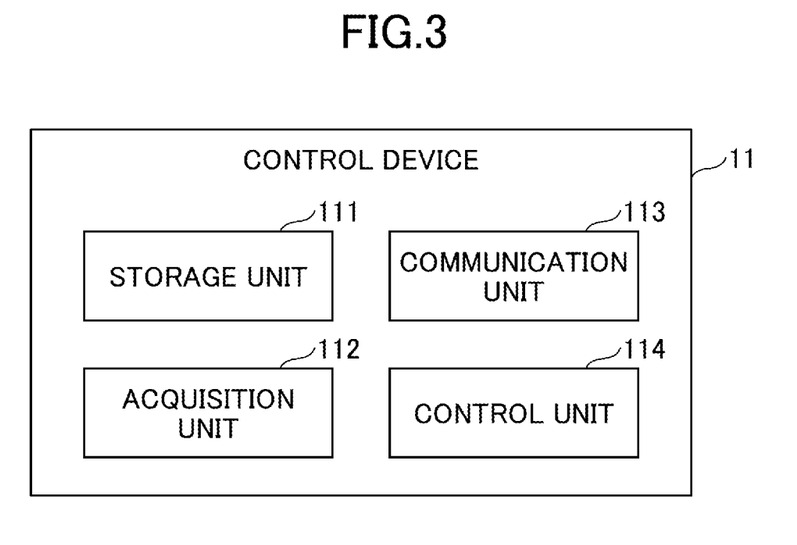
FIG. 3 is a diagram illustrating an example of a functional configuration of a controller according to an embodiment.

Next, a functional configuration of the control device 11 of the ventilator 10 according to the embodiment will be described with reference to FIG. 3. FIG. 3 is a diagram illustrating an example of a functional configuration of the control device 11 according to the embodiment.

<<Control Device 11 of Ventilator 10>>

The control device 11 of the ventilator 10 includes a storage unit 111, an acquisition unit 112, a communication unit 113, and a control unit 114. These units may be implemented, for example, in cooperation with one or more programs installed in the control device 11 and hardware such as the CPU 101 of the control device 11.

The storage unit 111 stores various information. The acquisition unit 112 acquires various information from the external device. The communication unit 113 communicates with an external device. The control unit 114 controls each part of the control device 11.

<Process>

Figure 4:
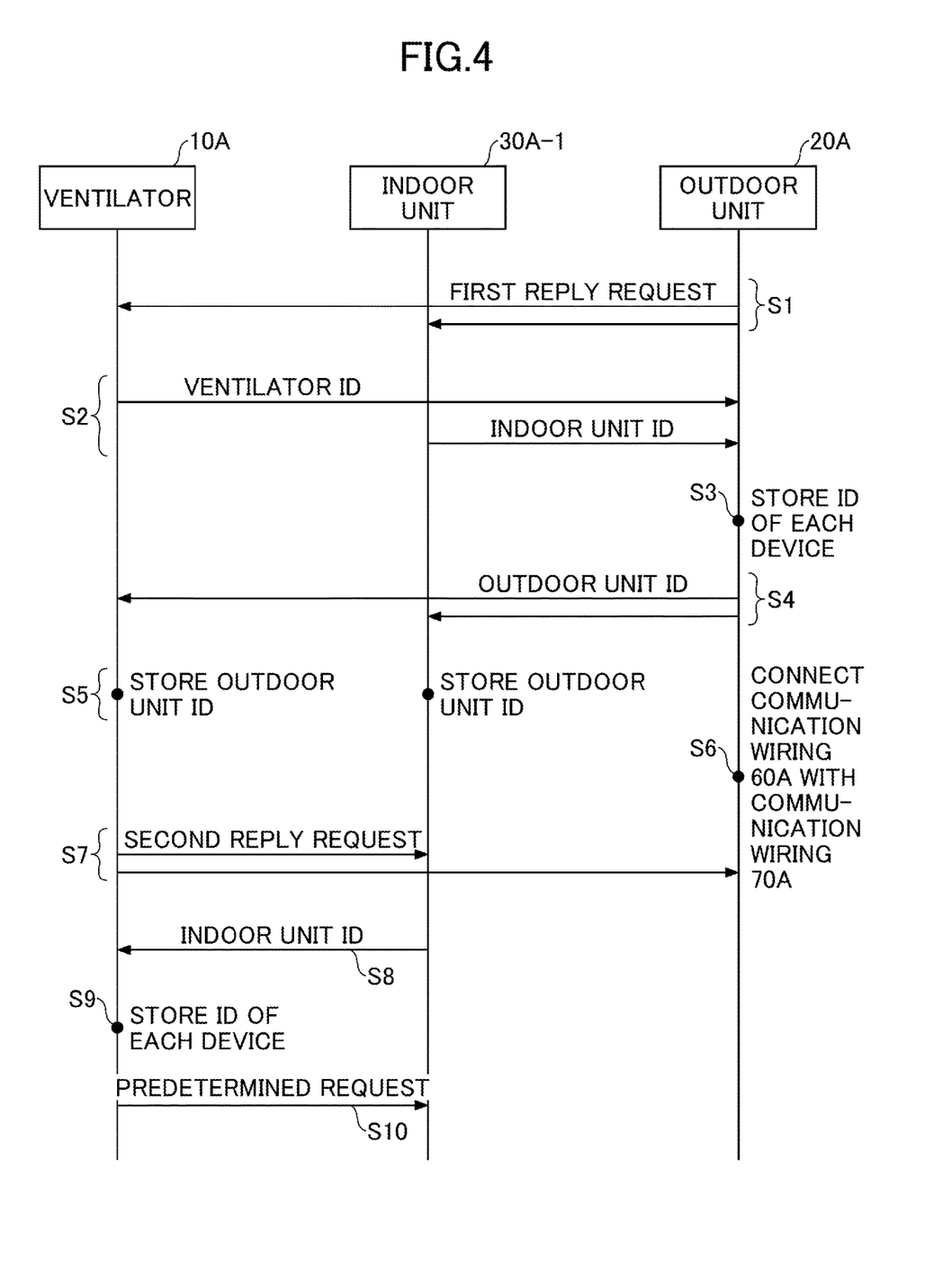
FIG. 4 is a sequence diagram illustrating an example of processing of a communication system according to an embodiment.

Next, an example of processing of the communication system 1 according to an embodiment will be described with reference to FIG. 4. FIG. 4 is a sequence diagram illustrating an example of processing of the communication system 1 according to the embodiment. Hereinafter, the indoor unit 30A-1, the indoor unit 30A-2, and the indoor unit 30A-3, which are connected to the outdoor unit 20A by the communication wiring 60A, are also referred to as the indoor unit 30A-1 or the like, as appropriate.

In step S1, the outdoor unit 20A transmits a first reply request to the communication wiring 60A by a broadcast communication (broadcast).

(Example of Blocking Communication Between Communication Wiring 60A and Communication Wiring 70A by Relay Circuit)

The outdoor unit 20A may transmit the first reply request to the communication wiring 60A while communication between the communication wiring 60A and the communication wiring 70A is disconnected. In this case, the outdoor unit 20A may include a first terminal (a first port) to which the communication wiring 60A is connected and a second terminal (a second port) to which the communication wiring 70A is connected, and when the communication between the first terminal and the second terminal is disconnected, the first reply request may be transmitted from the communication wiring 60A. In this case, for example, the outdoor unit 20A may open (turn off or shut down) the relay circuit provided between the first terminal and the second terminal and electrically disconnect between the first terminal and the second terminal so as to disconnect the communication between the communication wiring 60A and the communication wiring 70A.

(Example of Blocking Communication in Communication Wiring 60A with respect to Communication Wiring 70A by Bandpass Filter)

Further, the outdoor unit 20A may block the communication in the communication wiring 60A with respect to the communication wiring 70A, for example, by a bandpass filter (a high-pass filter or a low-pass filter) provided between the first terminal to which the communication wiring 60A is connected and the second terminal to which the communication wiring 70A is connected. In this case, the outdoor unit 20A may transmit the first reply request from the first terminal to the communication wiring 60A by using, for example, a frequency signal to be blocked by the bandpass filter. In this case, for example, the outdoor unit 20A may electrically connect the communication wiring 60A and the communication wiring 70A through a high-pass filter that blocks the signal of a frequency less than or equal to a threshold value (cutoff frequency). The outdoor unit 20A may transmit the first reply request from the first terminal to the communication wiring 60A by using the signal at a frequency less than or equal to the threshold value (i.e., low frequency pulse). In this case, since the outdoor unit 20A always connects the first terminal and the second terminal through the bandpass filter, a process of Step SE described later may be omitted. Accordingly, if the signal is at a frequency that is not to be blocked by the bandpass filter, the signal is transmitted (relayed) from the communication wiring 70A to the communication wiring 60A. Therefore, for example, even while the processes of Step S1 to Step S5 are being performed (during a system recognition process), monitoring and control of the indoor unit 30A-1 or the like can be performed by the controller 500.

The outdoor unit 20A may be able to switch between a mode in which the communication between the communication wiring 60A and the communication wiring 70A is blocked by the relay circuit through an operation using a button or the like and a mode in which the communication in the communication wiring 60A with respect to the communication wiring 70A is blocked by the bandpass filter The outdoor unit 20A may perform the process in step S1, for example, when the power of the outdoor unit 20A is turned on, when a predetermined operation such as pressing a switch is performed, or when a predetermined command is received from an external device.

Subsequently, upon receiving the first reply request, the communication unit 113 of the ventilator 10A, the indoor unit 30A-1, or the like respectively returns identification information (i.e., ID) of their own device to the communication wiring 60A (step S2). Subsequently, the outdoor unit 20A stores the ID of each device returned in response to the first reply request (step S3).

Subsequently, the outdoor unit 20A uses the ID of each device to transmit the ID of the outdoor unit 20A to each device (step S4). The ID of the outdoor unit 20A is also used as identification information (i.e., system ID) of the refrigerant system by the communication wiring 60A and the refrigerant pipe 50A. The ID of the outdoor unit 20 may be set to the outdoor unit 20 in advance, for example, at the time of factory shipment of the outdoor unit 20.

Subsequently, the storage unit 111 of the ventilator 10A and the indoor unit 30A-1 respectively store the received ID of the outdoor unit 20A (step S5).

Subsequently, the outdoor unit 20A connects the communication wiring 60A with the communication wiring 70A (step S6). Accordingly, for example, the controller 500 can communicate with the indoor unit 30A-1 or the like connected to the communication wiring 60A. The outdoor unit 20A may notify the controller 500 of the ID of each device returned in response to the first reply request and the ID of the outdoor unit 20A by, for example, broadcasting communication specifying a range of "in-facility" to be described later through the adapter 40.

Subsequently, the acquisition unit 112 of the ventilator 10A transmits a second reply request including the ID of the outdoor unit 20A and the ID of the ventilator 10A through the broadcast communication (step S7). Here, the second reply request may include information specifying a type of an electronic device requesting a reply. The type of the electronic device may include, for example, a model of the electronic device, an item to be measured by the electronic device, and a command to be executed by the electronic device.

The model of the electronic device may include, for example, an indoor unit of an air conditioner and a sensor for measuring environmental information. The item to be measured by the electronic device may include, for example, an outside air temperature, which is the outside air temperature of the facility in which the ventilator 10A is installed, an indoor room temperature, which is the temperature of the space A, and a set temperature, which is set by the user with respect to the space A. The commands to be executed by the electronic device may include, for example, a shutdown operation and a start operation In Step S7, the acquisition unit 112 of the ventilator 10A may transmit the second reply request including information specifying a transfer range according to the type of the electronic device. The transfer range may include, for example, "in same system (within the same internal and external wiring)," "under same adapter," and "in-facility." When "in same system" is specified, the ventilator 10A may transmit a second reply request including the system ID information stored in the process of step S5.

When "under same adapter" is specified, the outdoor unit 20A transmits the second reply request received from the communication wiring 60A to the communication wiring 70A. Further, the outdoor unit 20B transmits the second reply request received from the communication wiring 70A to the communication wiring 70B. Then, the adapter 40 does not transmit the second reply request received from the communication wiring 70B to the communication wiring 70C and the communication wiring 70D.

When "in-facility" is specified, the outdoor unit 20A transmits the second reply request received from the communication wiring 60A to the communication wiring 70A. Further, the outdoor unit 20B transmits the second reply request received from the communication wiring 70A to the communication wiring 70B. Then, the adapter 40 transmits the second reply request received from the communication wiring 70B to the communication wiring 70C and the communication wiring 70D.

Accordingly, for example, the acquisition unit 112 of the ventilator 10A may specify the "in-facility" as the transfer range with respect to the electronic device that measures the outside air temperature, and specify the "in same system" as the transfer range with respect to the electronic device that stores the set temperature for the space A. Hereinafter, an example in which "in same system" is specified as the transfer range will be described.

Subsequently, the indoor unit 30A-1 or the like determines whether the system ID included in the second reply request received from the ventilator 10A matches the system ID set from the outdoor unit 20A, and returns the ID of its own device to the ventilator 10A only when the system ID matches the system ID set from the outdoor unit 20A (Step S8). Here, the indoor unit 30A-1 or the like that received the second reply request responds to the second reply request only when the system ID included in the second reply request matches the system ID stored in the process in step S5. Further, when the received second reply request includes information specifying the type of the electronic device requesting a reply, the indoor unit 30A-1 or the like may determine whether the specified type matches the type of its own device, and may reply with the ID of its own device only when the specified type matches the type of its own device.

Each of the indoor unit 30A-1 or the like may set the ID of the ventilator 10A as a destination and transmit a communication packet including information such as the ID of the indoor unit 30A-1 to the communication wiring 60A.

Subsequently, the storage unit 111 of the ventilator 10A stores the ID of each device returned in response to the second reply request (Step S9). Here, when IDs of the plurality of electronic devices are returned in response to the second reply request, the plurality of electronic devices are stored in association with each other. In the example of FIG. 4, the ventilator 10A stores the indoor unit 30A-1, the indoor unit 30A-2, and the indoor unit 30A-3 in association. Accordingly, devices for air conditioning or the like in the same space are associated with each other.

Subsequently, the control unit 114 of the ventilator 10A transmits a predetermined request to the indoor unit 30A-1 or the like by using the ID of each device (step S10). Here, when the ventilator 10A operates, the ventilator 10A transmits a command for controlling the indoor unit 30A-1 or the like to the indoor unit 30A-1 or the like. Further, the ventilator 10A receives data from the indoor unit 30A-1 or the like when the ventilator 10A operates.

Here, the control unit 114 of the ventilator 10A may perform cooling by ventilation without operating the indoor unit 30A-1 and the outdoor unit 20A, for example, in the case where the user instructs the start of cooling operation by a remote control operation of the indoor unit 30A-1 or the like at a time when, for example, the difference in temperature between daytime and night (the difference in cold and warm temperatures) is relatively large and the outside temperature is lower than the cooling setting temperature, depending on the time of day in some time periods.

In this case, the ventilator 10A receives a notification from the indoor unit 30A-1 that the user instructs the ventilator to start the cooling operation. Then, the ventilator 10A acquires the current outside air temperature from, for example, the outdoor unit 20A. Then, the ventilator 10A acquires, for example, the set temperature, the room temperature, and the operation mode currently set for the indoor unit 30A-1 from the indoor unit 30A-1. Then, the ventilator 10A, for example, transmits a command to stop operation to the indoor unit 30A-1 and operates a ventilation fan to take in outdoor air when the current outside air temperature is lower than the indoor temperature, the currently set operation mode is a cooling operation, and the indoor temperature is higher than the set temperature.

Then, the ventilator 10A may stop the ventilation fan and transmits a command for starting an operation to the indoor unit 30A-1 when the current outside air temperature and the indoor temperature are approximately the same, the operation mode currently set in the indoor unit 30A-1 is the cooling operation, and the indoor temperature is higher than the set temperature.

<Effect of Disclosed Embodiment>

According to the above-described embodiment of disclosure, the information of the external device can be appropriately set in the device. For example, when the indoor units 30A-1 or the like is connected with the ventilator 10A, if the communication wiring 60A is arranged and connected so that the respective indoor units 30A-1 and the ventilator 10A are placed under the same outdoor unit 20A, the pairing between the respective indoor units 30A-1 and the ventilator 10A is automatically made. Accordingly, a labor for setting the pairing of the construction workers can be reduced. Further, according to the disclosed embodiment, setting mistakes can be prevented compared to the case where the ventilator 10A manually sets information such as the indoor unit 30A-1. It is also possible to eliminate the need for workers who perform pairing settings. Further, even when the relatively expensive controller 500 is not provided, the indoor unit 30 and the ventilator 10 can be operated in coordination.

<Modification>

Each of the functions of the control device 11 may be implemented, for example, by cloud computing executed by one or more computers.

Although a description has been given of the embodiments, it may be understood that various modifications may be made to the configurations and details thereof, without departing from the subject matter and scope of the claims.

This international application claims priority under Japanese Patent Application No. 2020-119742, filed on Jul. 13, 2020, the entire contents of which are hereby incorporated by reference.

DESCRIPTION OF SYMBOLS 1 communication system
10 ventilator
11 control device
20 outdoor unit
30 indoor unit
40 adapter
50A, 50B refrigerant pipe
60A, 60B, 70 communication wiring

The invention claimed is:

1. A communication system in which a first electronic device and a second electronic device, both connected to a single network, are associated with each other as being installed within a same space among a plurality of networks formed based on a wiring arrangement of a plurality of electronic devices in a plurality of spaces, the system comprising a relay device connecting a first network and a second network, the first network being the single network connecting the first electronic device and the second electronic device, the second network being a network different from the first network, wherein
in a state where communication between the first network and the second network is disconnected, the relay device:
transmits a first reply request, via the first network, to both the first electronic device and the second electronic device,
transmits first network identification information to the first electronic device upon receiving first electronic device identification information sent by the first electronic device to the relay device in response to the first reply request, and
transmits the first network identification information to the second electronic device upon receiving second electronic identification information sent by the second electronic device to the relay device in response to the first reply request, wherein
the first electronic device, upon receiving the first network identification information transmitted from the relay device, transmits a second reply request to the second electronic device, the second reply request including the received first network identification information, and
the second electronic device transmits the second electronic device identification information to the first electronic device upon confirming that the first network identification information included in the second reply request matches the first network identification information received from the relay device.

2. The communication system according to claim 1, wherein the plurality of networks are each connected via a single relay device.

3. The communication system according to claim 1, wherein the second reply request includes information for specifying a type of the second electronic device, and
the second electronic device transmits the second electronic device identification information in a case where a set type of the second electronic device matches the type of the second electronic device included in the second reply request.

4. The communication system of claim 3, wherein the type of the second electronic device includes at least one of a model of the second electronic device, an item to be measured by the second electronic device, and a command to be executed by the second electronic device.

5. The communication system according to claim 1, wherein the second reply request includes information for specifying a transfer range according to a type of the second electronic device, and the communication system determines whether to transfer the second reply request to an external network according to the information for specifying the transfer range.

6. The communication system according to claim 1, wherein the relay device transmits the first network identification information by a broadcast communication.

7. The communication system according to claim 1, wherein the relay device:
electrically connects the first network and the second network through a high-pass filter that blocks a signal with a frequency below a threshold;
transmits the first reply request to both the first electronic device and the second electronic device via the first network rising a signal with a frequency below the threshold.

8. The communication system according to claim 1, wherein, in a case where device identification information of a plurality of second electronic devices is transmitted returned with respect to the second reply request including the first network identification information of the first network, the first electronic device associates the plurality of second electronic devices.

9. The communication system according to claim 1, wherein the first electronic device and the second electronic device are electronic devices that perform at least one of measuring environmental information and air conditioning with respect to an indoor space, and
the first electronic device transmits a command for controlling the second electronic device or receives data from the second electronic device when the first electronic device is in operation.

10. The communication system according to claim 1, wherein the first electronic device is a ventilator, the second electronic device is an indoor unit of an air conditioner, and the relay device is outdoor unit of the air conditioner.

11. A communication method implemented by a communication system, the system comprising a relay device connecting a first network and a second network, the first network being the single network connecting the first electronic device and the second electronic device, the second network being a network different from the first network, the communication method comprising:
in a state where communication between the first network and the second network is disconnected,
associating a first electronic device with a second electronic device, both devices being connected to a single network and being installed within a same space, among a plurality of networks formed based on a wiring arrangement of the plurality of electronic devices in a plurality of spaces, wherein the method further comprises:
transmitting, by the relay device, a first reply request, via the first network, to both the first electronic device and the second electronic device,
transmitting, by the relay device, first network identification information to the first electronic device upon receiving first electronic device identification information sent by the first electronic, device to the relay device in response to the first reply request, and
transmitting, by the relay device, the first network identification information to the second electronic device upon receiving second electronic identification information sent by the second electronic device to the relay device in response to the first reply request,
receiving, by the first electronic device, the first network identification information transmitted from the relay device,
transmitting, by the first electronic, device, a second reply request to the second electronic device, the second reply request including the received first network identification information, and
receiving, by the second electronic device, the first network identification information transmitted from the relay device, and
transmitting, by the second electronic device, the second electronic device identification information to the first electronic device upon confirming that the first network identification information included in the second reply request matches the first network identification information received from the relay device.

12. A non-transitory computer-readable recording medium having stored therein an information processing program that causes a communication system to execute a process, the system comprising a relay device connecting, a first network and a second network, the first network being the single network connecting the first electronic device and the second electronic device, the second network being a network different from the first network, the process comprising:
in a state where communication between the first network and the second network is disconnected,
associating a first electronic device with a second electronic device, both devices being connected to a single network and being installed within a same space, among a plurality of networks formed based on a wiring, arrangement of the plurality of electronic devices in a plurality of spaces, wherein the process further comprises:
transmitting, by the relay device, a first reply request, via the first network, to both the first electronic device and the second electronic device,
transmitting, by the relay device, first network identification information to the first electronic device upon receiving first electronic device identification information sent by the first electronic, device to the relay device in response to the first reply request, and
transmitting, by the relay device, the first network identification information to the second electronic device upon receiving second electronic identification information sent by the second electronic device to the relay device in response to the first reply request,
receiving, by the first electronic device, the first network identification information transmitted from the relay device,
transmitting, by the first electronic device, a second reply request to the second electronic device, the second reply request including the received first network identification information, and
receiving, by the second electronic device, the first network identification information transmitted from the relay device, and
transmitting, by the second electronic device, the second electronic device identification information to the first electronic device upon confirming that the first network identification information included in the second reply request matches the first network identification information received from the relay device.

* * * * *